(No Model.) 2 Sheets—Sheet 1.
A. CALDWELL.
AGRICULTURAL IMPLEMENT.

No. 486,850. Patented Nov. 29, 1892.

Witnesses
John Buckler
Isabel Chester

Inventor
A. Caldwell.
By his Attorney
A. M. Pierce (No Model.) 2 Sheets—Sheet 2.

A. CALDWELL.
AGRICULTURAL IMPLEMENT.

No. 486,850. Patented Nov. 29, 1892.

Witnesses
John Buckler
Isabel Chester

Inventor,
A. Caldwell,
By his Attorney
A. M. Pierce.

UNITED STATES PATENT OFFICE.

ALEXANDER CALDWELL, OF ESSEX, IOWA.

AGRICULTURAL IMPLEMENT.

SPECIFICATION forming part of Letters Patent No. 486,850, dated November 29, 1892.

Application filed November 5, 1891. Serial No. 410,968. (No model.)

*To all whom it may concern:*

Be it known that I, ALEXANDER CALDWELL, a citizen of the United States, residing at Essex, in the county of Page and State of Iowa, have invented a new and useful Improvement in Agricultural Implements, of which the following is a specification.

My invention relates especially to implements used as listers, ditchers, or trench-diggers, adapted for either riding or walking, and has for its object the provision of an implement which will work in all kinds of soil, can be used as a lister, plowing ditches for irrigation or drainage, or a trench-digger for such crops as corn, sugar-cane, cotton, celery, &c., which may be readily adapted to the class of work to be done, very light of draft, and highly effective in use.

To attain the desired end, my invention consists, essentially, in a two-wheeled tongued implement having a low double plowshare with double shim-pieces running upward in a curve from the share, said plow having no mold-boards, but being a double skeleton. Instead of mold-boards the revoluble disks are employed, placed at the right and left of the share and a little to the sides thereof, a circular cutter being centrally and rearwardly located between said disks; and my invention also involves certain other novel and useful combinations or arrangements of parts and peculiarities of construction and operation, all of which will be hereinafter first fully described, and then pointed out in the claims.

Figure 1:
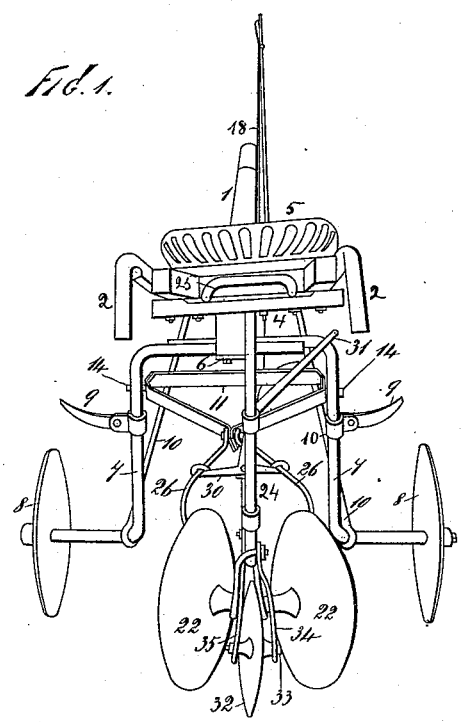
Figure 2:
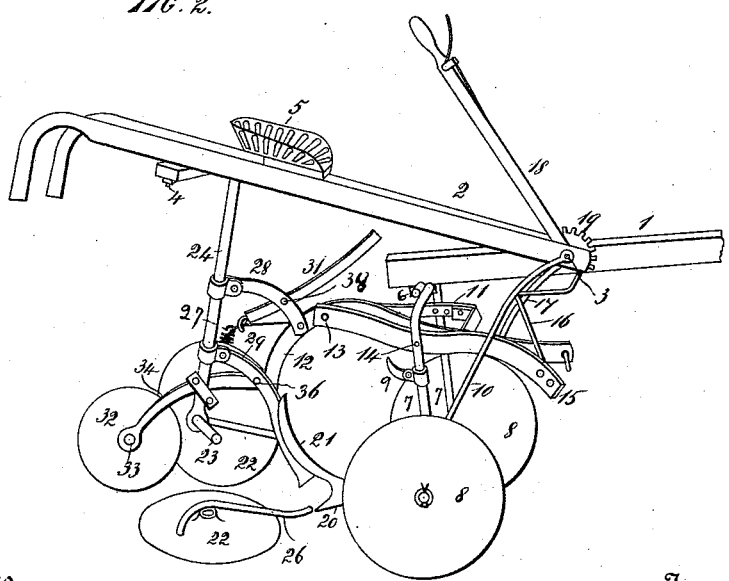
Figure 3:
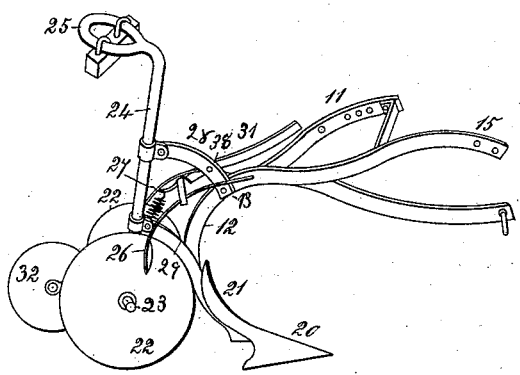

In the drawings, Figure 1 is a rear view of my improved implement. Fig. 2 is a side elevation thereof with one of the mold-board disks removed. Fig. 3 is a side elevation of the plow and disks shown as removed from the truck.

Similar numerals of reference indicate corresponding parts in all the figures.

1 is the tongue.

2 are the handles secured thereto at 3 and provided with a cross-piece 4.

5 is the seat mounted upon the handles.

6 is a casting secured beneath grooves in the under side of the rear of the tongue.

7 7 are double crank-pieces secured to the tongue by the casting 6, the lower projecting arms of said cranks forming the axles for the truck-wheels 8.

9 9 are foot-rests secured to pieces 7.

10 10 are braces passing from the truck-axle to the bolt 3, which passes through the tongue 1.

11 is a metal frame to which the plow-beam 12 is secured at 13. This frame is pivoted to the truck-arch formed by the pieces 7 at 14 14. A curved arm 15 extends forward from the frame 11 and engages with a link 16, which is connected to the bent lower end 17 of a lever 18, pivoted upon bolts 3.

19 is a notched segment secured to the tongue 1, and lever 18 is provided with the usual catch-bolt for engaging with said segment. By this arrangement the plow-beam may be raised or depressed.

20 is the skeleton plowshare, the same being made double and projecting to the right and left of the beam 12, only one side being shown in the drawings, the other being a duplicate thereof. From each share extends an upwardly-curved shim-piece 21, the beam passing down therebetween, the object of this construction and arrangement being to cut and loosen the soil and give it a preliminary turn to each side.

22 22 are rotatable disks, the concave sides being placed outward with no hubs on concave side. These disks act as mold-boards. They are mounted upon arms 23, extending outward and slightly forward at an angle from a standard 24, passing upward and terminating in a loop 25, arranged to be secured to the cross-piece 4, fixed to the handles 2. By placing these disk mold-boards to the rear and out of line with the plowshares and mounting them upon axles at an angle to the line of draft after the soil is loosened by the plowshares it will be taken up by the disks 22 and thrown to the right and left and turned entirely over.

28 and 29 are supports for standard 24, secured to the plow-beam 12.

26 26 are two cleaners consisting of spring-steel shanks secured at their forward extremities to the beam 12, passing down at the outside of each disk 22 and having a flattened end bearing thereagainst. A spring 27 passes from the support 29 to a connecting-piece 30, said piece engaging with a bar 31, pivoted at 38 and arranged to be manipulated by the foot of the operator.

32 is a circular cutter mounted on a shaft 33, held by two bars 34 and 35, clamped to standard 24 and bolted to the plow-beam at 36. This cutter runs in a straight line, forming a guide for the plow, and, entering the soil at the rear of and below the line in which the plow runs, cuts a trench deeper than the plow and disks 22.

It will thus be seen that my improved implement is admirably adapted to the uses and purposes for which it is intended.

I do not in this application claim the combination, with the skeleton plow, of a single mold-board disk and the colter-disk, the same being in part the subject of my application, Serial No. 410,967, filed November 5, 1891.

Having now fully described my invention, what I claim as new therein, and desire to secure by Letters Patent, is—

1. In a device of the character herein specified, the combination, with the standard 24, of the two disks mounted upon the horizontal arms at the base thereof, substantially as shown and described.

2. In a device of the character herein specified, the combination, with the double skeleton plowshare, of the two revoluble disks, mounted upon the horizontal arms at the base of the standard 24, said disks being to the rear and sides of the share, substantially as shown and described.

3. In an implement of the character herein specified, the combination of the double skeleton plowshare, the disks 22, and the adjustable cutter 32 between said disks 22, substantially as shown and described.

4. The combination, with the supporting truck and frame 11, of the double skeleton plowshare, disks 22, standard 24, and cutter 32, adapted and arranged to be disconnected from the truck, substantially as shown and described.

ALEX. CALDWELL.

Witnesses:
L. N. WILSON,
H. C. BLEAKLEY.